United States Patent
Sandell

(10) Patent No.: US 8,165,231 B2
(45) Date of Patent: Apr. 24, 2012

(54) WIRELESS COMMUNICATIONS APPARATUS

(75) Inventor: Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 908 days.

(21) Appl. No.: 12/201,430

(22) Filed: Aug. 29, 2008

(65) Prior Publication Data
US 2009/0060074 A1 Mar. 5, 2009

(30) Foreign Application Priority Data

Aug. 31, 2007 (GB) .................................. 0716998.0

(51) Int. Cl.
H04L 27/28 (2006.01)

(52) U.S. Cl. ......... 375/260; 375/267; 375/299; 375/146

(58) Field of Classification Search .................. 375/260, 375/267, 141, 146, 295, 299
See application file for complete search history.

(56) References Cited

U.S. PATENT DOCUMENTS

| 7,676,007 B1 * | 3/2010 | Choi et al. ..................... 375/347 |
| 2006/0039489 A1 * | 2/2006 | Ikram et al. ..................... 375/260 |
| 2008/0187061 A1 * | 8/2008 | Pande et al. ..................... 375/260 |

* cited by examiner

Primary Examiner — Dac Ha
(74) Attorney, Agent, or Firm — Oblon, Spivak, McClelland, Maier & Neustadt, L.L.P.

(57) ABSTRACT

Precoding a plurality of subcarriers in preparation for MIMO transmission is carried out by deriving preceding matrices from available information. When the number of data streams borne by the subcarriers equates to the number of transmit antennas employed in the MIMO transmission, the method comprises deriving, from respective acquired unitary precoder matrices for two of said subcarriers, interpolated precoder matrices for data streams intermediate the two subcarriers. The acquired and interpolated precoder matrices are then applied, as the case may be, at the respective subcarriers. The step of deriving the interpolated precoder matrices comprises determining an overall rotation matrix representing a transformation between the acquired precoder matrices, determining from the overall rotation matrix a further rotation matrix representing a step transformation for interpolation steps between said two subcarriers, and recursively applying said further rotation matrix to derive said interpolated precoder matrices. In the event that the number of data streams is less than the number of transmit antennas employed in said MIMO transmission, the rectangular precoder matrices should first be converted into square unitary matrices.

19 Claims, 4 Drawing Sheets

WIRELESS COMMUNICATIONS APPARATUS

The present invention concerns wireless communications apparatus, particularly wireless transmitters and receivers (including combined apparatus, known as transceivers), employing OFDM.

In a system employing precoding, a transmitter uses channel knowledge in order to enhance link quality. Precoding is applied to data streams, on the basis of subcarriers intended for transmission. Each subcarrier can bear one or more data streams. In particular, a subcarrier can be defined in frequency, time, by code or by any other appropriate manner of distinction.

In an OFDM system, a precoding matrix is applied to each individual subcarrier. This precoding matrix is either computed by the transmitter from channel knowledge (fed back or estimated) or is fed back to the transmitter by the receiving station. In practice, the former solution involves feedback of a substantial amount of information, while the latter implicates a large computational burden at the transmitter.

Therefore, it is desirable to reduce the amount of information passed back to the transmitter, or computed at the transmitter. One approach to this is to handle only information relating to a subset of the subcarriers, and to obtain information relating to the remaining subcarriers by interpolation.

In the case wherein information is computed by the transmitter on the basis of channel knowledge, this involves determining information relating to a subset of the subcarriers, on the basis of the channel knowledge, and then interpolating at the transmitter to determine information relating to the remainder of the subcarriers. In the other case, wherein a precoding matrix is fed back from the receiving station to the transmitter, the precoding matrix represents merely a subset of the subcarriers, while the transmitter then reconstructs information relating to other subcarriers by interpolation.

The task of interpolation in a unitary precoder can be implemented in a number of different ways. One of the most suitable ways in which this can be achieved is "geodesic interpolation on the Stiefel manifold", which originated in robotics to produce trajectories (C. Belta, V. Kumar, "An SVD-based projection method for interpolation on SE(3)", *IEEE Transactions on Robotics and Automation,* vol 18, no 3, pp 334-345, June 2002: "Belta et al.").

This has subsequently been applied to interpolation of unitary precoders (N. Khaled, R. Heath, G. Leus, B. Mondal, F. Petre, "Interpolation-based multi-mode precoding for MIMO-OFDM systems", EUSIPCO 2005: "Khaled et al.").

Other techniques involve transformations to allow linear interpolation. It should be noted that linear interpolation of the unitary matrices themselves is not possible, since this will not in general produce a unitary matrix. Hence, a transformation of some sort is necessary.

Although the performance of the interpolation in Khaled et al. is considered to be good, it suffers from high computational complexity. Aspects of the invention provide a simple method with low complexity to perform the interpolation. Aspects of the invention provide such a method with equivalence to Khaled et al. but with significantly lower complexity.

An aspect of the present invention provides a wireless communications station which receives precoder information concerning a subset of employed subcarriers and which then implements an algorithm with low complexity to interpolate the unitary precoders. This can be used to interpolate between, e.g., subcarriers in an OFDM system to avoid computing the actual precoder on every subcarrier.

A first aspect of the invention comprises a method of precoding a plurality of subcarriers in preparation for MIMO transmission, the subcarriers bearing one or more data streams, the number of data streams equating to the number of transmit antennas employed in said MIMO transmission, the method comprising deriving, from respective acquired unitary precoder matrices for two of said subcarriers, interpolated precoder matrices for subcarriers intermediate said two subcarriers, and applying said acquired and interpolated precoder matrices, as the case may be, at the respective subcarriers, the step of deriving said interpolated precoder matrices comprising the steps of determining an overall rotation matrix representing a transformation between said acquired precoder matrices, determining from said overall rotation matrix a further rotation matrix representing a step transformation for interpolation steps between said two subcarriers, and recursively applying said further rotation matrix to derive said interpolated precoder matrices.

A second aspect of the invention comprises a method of precoding a plurality of subcarriers in preparation for MIMO transmission, the subcarriers bearing one or more data streams, the number of data streams being less than the number of transmit antennas employed in said MIMO transmission, the method comprising deriving, from respective acquired rectangular precoder matrices for two of said subcarriers, interpolated precoder matrices for subcarriers intermediate said two subcarriers, and applying said acquired and interpolated precoder matrices, as the case may be, at the respective subcarriers, the step of deriving said interpolated precoder matrices comprising the steps of converting said acquired matrices into square unitary matrices, determining an overall rotation matrix representing a transformation between said converted matrices, determining from said overall rotation matrix a further rotation matrix representing a step transformation for interpolation steps between said acquired subcarriers, and recursively applying said further rotation matrix to derive said interpolated precoder matrices.

According to a third aspect of the invention, there is provided a precoder for precoding a plurality of subcarriers in preparation for MIMO transmission, the subcarriers bearing one or more data streams, the number of data streams equating to the number of transmit antennas employed in said MIMO transmission, comprising interpolation means for deriving, from respective acquired unitary precoder matrices for two of said subcarriers, interpolated precoder matrices for subcarriers intermediate said two subcarriers, and precoder application means for applying said acquired and interpolated precoder matrices, as the case may be, at the respective subcarriers, wherein the interpolation means is operable to determine an overall rotation matrix representing a transformation between said acquired precoder matrices, to determine from said overall rotation matrix a further rotation matrix representing a step transformation for interpolation steps between said acquired subcarriers, and further to apply recursively said further rotation matrix to derive said interpolated precoder matrices.

According to a fourth aspect of the invention, there is provided a precoder for precoding a plurality of subcarriers in preparation for MIMO transmission, the subcarriers bearing one or more data streams, the number of data streams being less than the number of transmit antennas employed in said MIMO transmission, the precoder including interpolation means operable to derive, from respective acquired non-unitary precoder matrices for two of said subcarriers, interpolated precoder matrices for subcarriers intermediate said two subcarriers, and precoder matrix application means operable to apply said acquired and interpolated precoder matrices, as the case may be, at the respective subcarriers, and further including data conversion means operable to convert said acquired matrices into square unitary matrices, said interpolation means being operable to determine an overall rotation matrix representing a transformation between said converted matrices, then operable to determine from said overall rotation matrix a further rotation matrix representing a step transformation for interpolation steps between said acquired subcarriers, and further operable to applying recursively said further rotation matrix to derive said interpolated precoder matrices.

A MIMO transmitter may be provided incorporating the precoder so defined, and further comprising a plurality of transmit antennas, transformation means for transforming the precoded subcarriers into a plurality of time domain signals and antenna driving means for driving respective transmit antennas with said time domain signals.

It will be appreciated that the invention can be embodied by a computer apparatus configured by a computer program executed thereby, to perform any of the methods of the invention, and/or to become configured as apparatus of any aspect of the invention.

In that case, the computer program can be introduced by any practical means, such as by optical or magnetic storage media, by signal received such as through a download implemented by means of the internet, by smartcard, flash memory or other integrated circuit storage means, or by configuration using application specific hardware such as an ASIC.

A specific embodiment of the invention will now be described, by way of example only and with reference to the accompanying drawings, in which.

Figure 1:
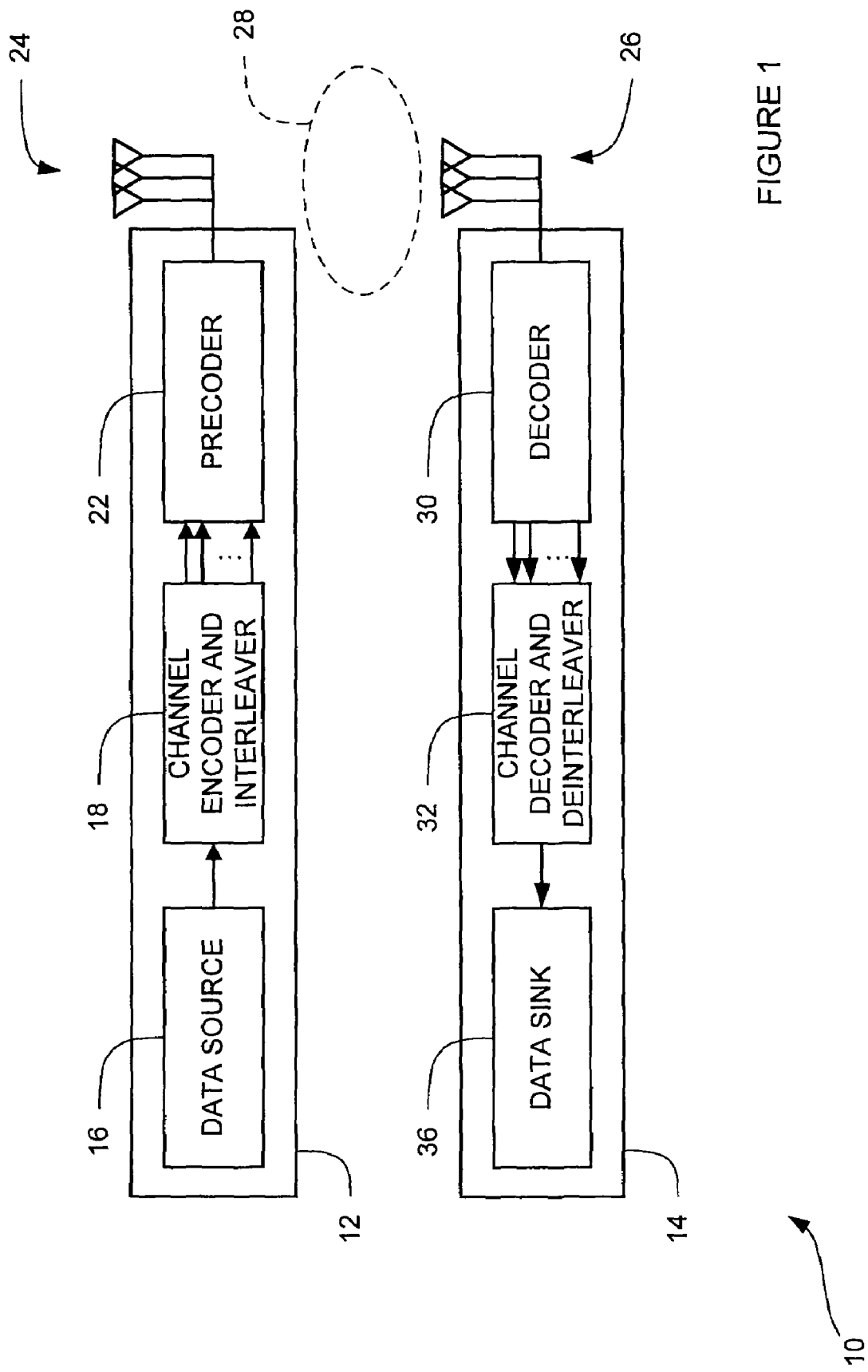
FIG. 1 illustrates a schematic diagram of a MIMO data communications system in accordance with a specific embodiment of the invention.

FIG. 1 illustrates a MIMO data communications system 10 comprising a transmitter device 12 and a receiver device 14. The transmitter device 12 comprises a data source 16, which provides data (comprising information bits or symbols) to a channel encoder and interleaver 18. The encoding part of the channel encoder and interleaver 18 in this example comprises a convolutional coder such as a recursive systematic convolutional (RSC) encoder. This operates such that more bits are output from the encoder than are presented to its input, and typically the rate is one half or one third. The interleaving part interleaves the bits into symbols in a manner that ensures that errors do not arise due to repeated transmission of a bit in a certain position in a data frame from the same antenna, or that adjacent bits are separated so that errors due to breaks in transmission are possibly capable of being recovered. The channel encoder and interleaver presents a plurality of demultiplexed data streams S to a precoder 22 which is the main focus of this embodiment. It will be appreciated that the precoder can be used in conjunction with a variety of configurations of communications apparatus, and is not limited to this implementation.

The precoder 22 encodes symbols on the incoming streams as a plurality of code symbols for simultaneous transmission from a transmitter antenna array 24 comprising a plurality of transmit antennas.

The encoded transmitted signals propagate through a MIMO channel 28 defined between the transmit antenna array 24 and a corresponding receive antenna array 26 of the receiver device 16. The receiver 16 is of generally conventional type, comprising a decoder 30 operable to detect and extract signals received at the antenna array 26.

The decoder 30 uses the channel perceived by the receiver to detect the spatial streams.

The receiver 14 of the specific embodiment is configured with the transmitter 12 in mind. The output of the decoder 30 comprises a plurality of signal streams, one for each transmit antenna 25, each carrying so-called soft or likelihood data on the probability of a transmitted symbol having a particular value. This data is provided to a channel de-interleaver and decoder 32 which reverses the effect of the channel encoder and interleaver 18 and develops convolutional code on the basis of the likelihood data provided by the decoder 30. This convolutional code is then presented to a channel decoding part of the channel decoder and de-interleaver 32. In this example, the channel decoding function comprises a Viterbi decoder, which is operable to decode the convolutional code.

The channel decoder and de-interleaver 32 then passes output data, which may be soft, likelihood information, or hard information, for further processing in an exemplary data sink 36.

Operation of the precoder 22 will now be described with reference to FIG. 2 of the drawings.

Figure 2:
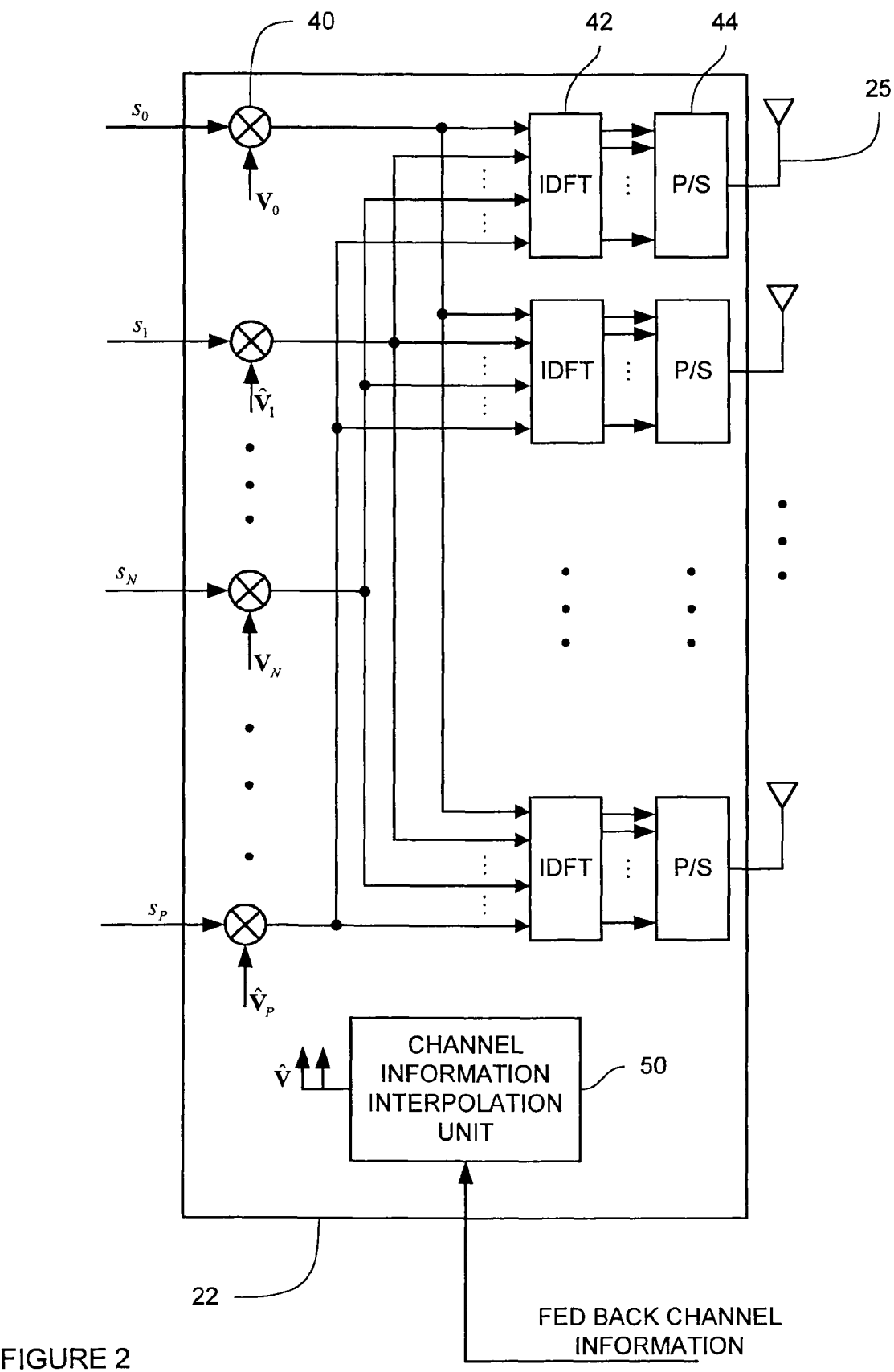
FIG. 2 illustrates a schematic diagram of a precoder of a transmitter of the system illustrated in FIG. 1.

As illustrated in FIG. 2, the precoder receives P data streams ($S_1$-$S_P$), each of which is multiplied by a preceding matrix $V_1$-$V_P$ at a respective multiplying unit 40. This precoded data stream is then passed to each of a plurality of inverse discrete Fourier transform units (IDFT) 42. The parallel output from each IDFT 42 are then passed to a parallel to serial converter 44, with incorporated driver architecture enabling a signal to be generated at the corresponding antenna 25.

The precoder matrices V are developed by a channel information interpolation unit 50 on the basis of received channel information which, in this example, is fed back from a receiver across the MIMO channel 28. It would be possible for the channel information to be estimated by the transmitter in an alternative embodiment of the invention. The channel information interpolation unit 50 takes available channel information, to develop a plurality of precoder matrices V corresponding to the plurality of data streams S to be precoded.

The method employed by the channel information interpolation unit 50 as described above will now be described by way of example, with the support of the flow diagram illustrated in FIG. 3. The method operates on the assumption that two unitary precoder matrices are available on two subcarriers in OFDM. This corresponds to one of two scenarios:

i) information about the channel and/or precoder is only available on these subcarriers; or
ii) information about the channel on the intermediate subcarriers is available but, for computational reasons, it is not desirable to explicitly compute all precoder matrices.

There may of course be other motivations for employing the present embodiment of the invention, and the reader will appreciate that the application of this embodiment is in no way limited to the above discussion.

Hence, it is desirable to interpolate the two unitary precoder matrices to obtain the intermediate ones.

As noted above, in this example the transmitter 12 has J data streams to transmit and M transmit antennas, where $M \geq J$. The precoder on subcarrier k is denoted $V_k$, which is an M-by-J matrix, and the two subcarriers for which the precoder is known are those denoted k=0 and k=N, respectively.

These can be classed as boundary conditions, for the purposes of mathematical derivation of other precoders. The precoder is unitary, i.e. $V_k^H V_k = I$.

For the avoidance of doubt, interpolated precoders are distinguished from precoders computed on a more robust basis by use of a circumflex (ˆ) to denote an interpolated precoder. A simple approach to interpolation that guarantees that all interpolated precoders $\hat{V}_k$ are unitary (a requirement for maintaining the transmit power) is to set $\hat{V}_k = P^k V_0$.

That is, to derive a given precoder $\hat{V}_k$, an M-by-M rotation matrix P is applied k times to the known precoder $V_0$. If P is unitary, then $P^k V_0$ will also unitary. From the boundary conditions, it can be deduced that $\hat{V}_0 = P^0 V_0 = V_0$ and $\hat{V}_N = P^N V_0 = V_N$, which means that $P^0 = I$ and $P^N = V_N V_0^H$. The former is true for all matrices P.

The interpolation matrix P should then be found. To demonstrate this, two cases are considered below. In case 1, the number of transmit antennas is equal to the number of data streams received by the precoder unit 22. In case 2, the number of transmit antennas exceeds the number of data streams.

Case 1: M=J

In this case, the constraint $P^N = V_N V_0^H$ implies that P should be the N:th root of $V_N V_0^H$. P can thus be computed from the eigenvalue decomposition $V_N V_0^H = U \Lambda U^H$ as $P = (V_N V_0^H)^{1/N} = U \Lambda^{1/N} U^H$, where the $a^{th}$ power of a diagonal matrix is defined as $\Lambda^a = \text{diag}(\lambda_1^a, \ldots, \lambda_M^a)$.

Case 2: M>J

In the case where there are more transmit antennas than data streams, the precoding matrices $V_k$ are rectangular and $P^N = V_N V_0^H$ is not unitary (so P is not unitary). In this case, the preceding matrices are augmented with their respective nullspaces $\tilde{V}_0, \tilde{V}_N \in C^{M \times (M-J)}$, i.e.:

$$P^N = [V_N \tilde{V}_N][V_0 \tilde{V}_0]^H, \text{ where } \tilde{V}_0^H V_0 = \tilde{V}_N^H V_N = 0.$$

This ensures that $P^N$ is a unitary matrix (and hence also that P is unitary) and that:

$$P^N V_0 = (V_N V_0^H + \tilde{V}_N \tilde{V}_0^H) V_0 = V_N$$

since $V_0^H V_0 = I$ and $\tilde{V}_0^H V_0 = 0$.

The nullspaces can be found by, for example, a simple Gram-Schmidt procedure (e.g. as illustrated in G. Golub, C. van Loan, "Matrix computations", Johns Hopkins University Press, 3rd ed., 1996: "Golub et al.").

Finally, it should be noted that $P^k = P P^{k-1}$ so the interpolation can be implemented recursively to save complexity.

Hence, the interpolation algorithm can be summarised as:
If M=J (Step S1-2)
  Compute the eigenvalue decomposition $V_N V_0^H = U \Lambda U^H$ (Step S1-4) else if M>J
  Find the nullspaces $\tilde{V}_0, \tilde{V}_N$ (Step S1-6)
  Compute the eigenvalue decomposition $V_N V_0^H + \tilde{V}_N \tilde{V}_0^H = U \Lambda U^H$ (Step S1-8)
Compute the rotation matrix $P = U \Lambda^{1/N} U^H$ (Step S1-10)
Interpolate the unitary precoders as $\hat{V}_k = P \hat{V}_{k-1}$ for k=1, ..., N-1 with $\hat{V}_{=V0}$ (Step S1-12).

Figure 3:
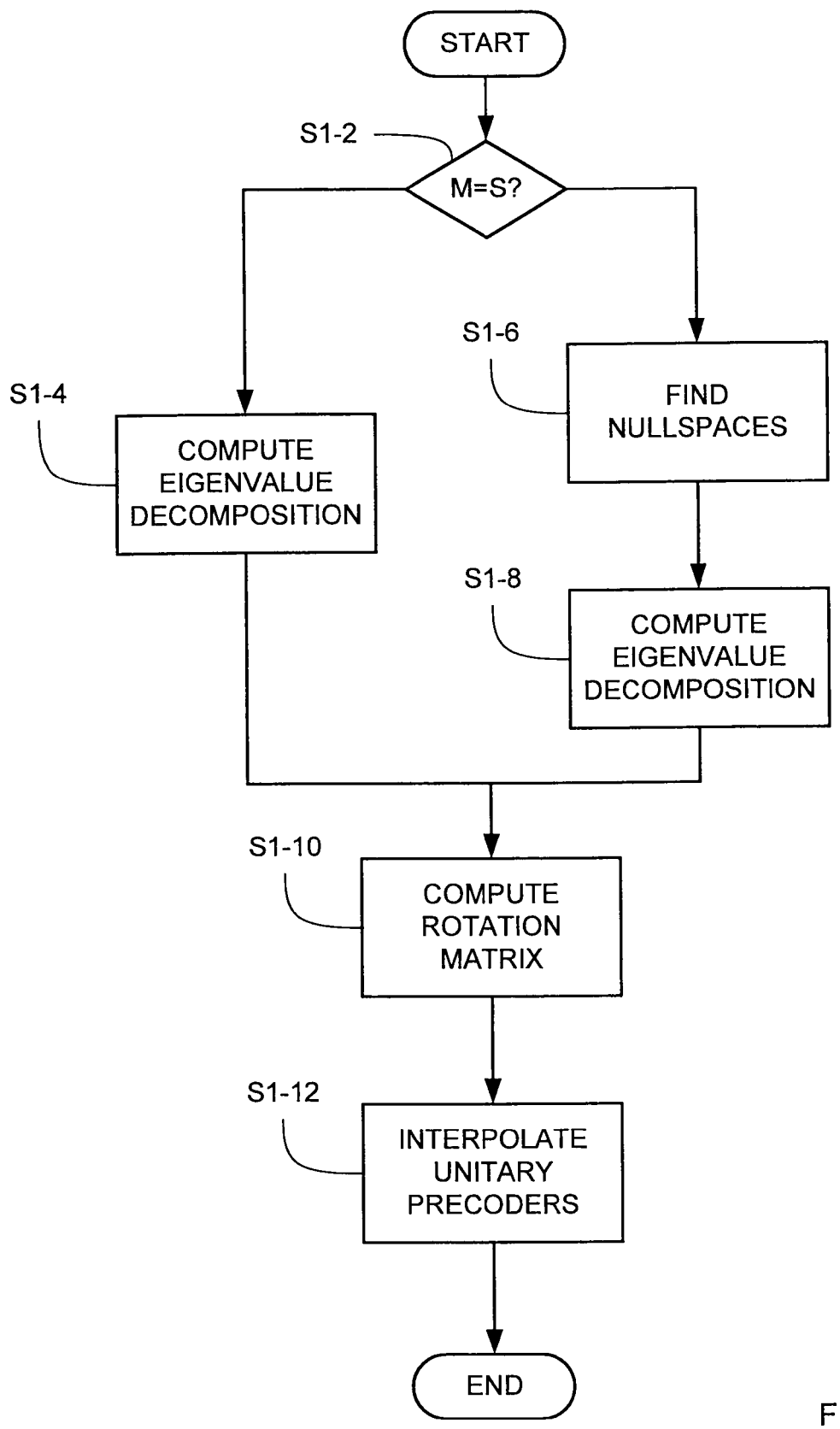
FIG. 3 illustrates a flow diagram illustrating operation of a channel information interpolation unit of the precoder illustrated in FIG. 2.

This is illustrated in FIG. 3, with steps as indicated above.

The N:th root of a matrix may also be computed in other ways; the eigenvalue decomposition technique above is merely an example.

In the above description, it is assumed that the two precoders $V_0$ and $V_N$ have been "preprocessed" to remove any discontinuities. Since the preceding matrix is only unique up to a (complex) scaling, and phase ramps from, for example, cyclic delay diversity, can cause the two precoders to be significantly different, it is important to align them as much as possible. Since there are always several equivalent precoders (in the sense that they have the same performance), it is possible to pre-process the precoders $V_0$ and $V_N$ to be as similar as possible. This will ensure that the interpolation produces meaningful results. As this is a known problem with known solutions, (for example as set out in Khaled et al.), no further discussion of this technique is required.

It should be noted that the geodesic interpolation presented in Khaled et al. is in fact equivalent to the above algorithm. Khaled et al. uses the exponential map of the matrix $V_0^H V_N = \exp(S)$ to perform the interpolation as $$\hat{V}_k = V_0 \exp\left(\frac{k}{N} S\right), k = 1, \ldots, N-1.$$

However, this means that the exponential map is interpolated, which needs to be transformed to obtain the unitary precoder. This needs to be done for each interpolated precoder $\hat{V}_k$. This computationally costly step is avoided in the present embodiment of the invention since all that is needed is to apply the rotation matrix P to the previous precoder $\hat{V}_{k-1}$ to obtain the interpolated precoder $\hat{V}_k = P \hat{V}_{k-1}$. This represents a significant saving in complexity. It should also be noted that the interpolation in Khaled et al. is not defined for M>J and is thus only available for the case where M=J.

The described embodiment thus allows for high performance precoder interpolation at reduced complexity, certainly in comparison with existing algorithms.

The principle on the basis of which the embodiment of the invention operates is that, in some cases, it is desirable to interpolate precoding/beamforming matrices since they are not available on all subcarriers in a MIMO OFDM system. This is either because of limited feedback or because it is too complex to compute them all. If the precoding matrices are required to be unitary, interpolation is not straightforward since it is difficult to ensure that all interpolated matrices are unitary. The described specific embodiment implements a low complexity method of interpolating unitary matrices while offer the same performance as other, more complex, techniques. The method consists of finding a rotation matrix and applying it recursively, which avoids costly computations of the individual interpolated matrices. It also presents a method of interpolating rectangular precoding matrices, a case which has not been studied in the identified literature.

Figure 4:
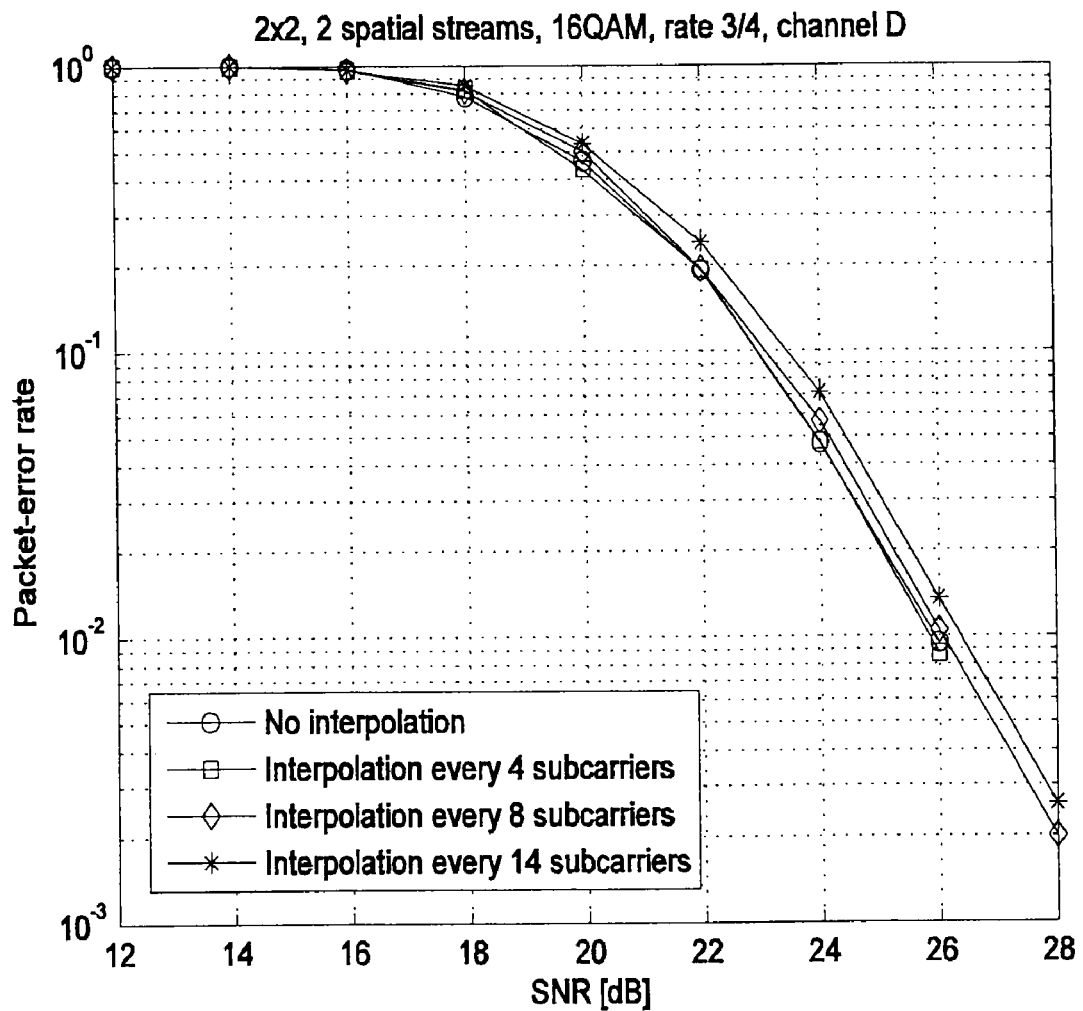
FIG. 4 illustrates a graph demonstrating experimental results for simulations of embodiments of the invention.

Results of simulations of the performance of the interpolated precoders are illustrated in FIG. 4. For the simulation, an IEEE802.11n system was employed. A transmitter with two antennas, and a receiver also with two antennas, was simulated with 16 QAM modulation and rate ¾ channel code. The precoders of such simulated devices, at certain subcarriers, can be computed from the estimated channel and interpolated using the above technique. Perfect feedback of the channel estimates was assumed (no quantisation or delay). As can be seen from FIG. 4, when interpolating between every 4 and 8 subcarriers, only a marginal degradation occurs, while there is about 0.5 dB degradation when interpolating between 14 subcarriers. This shows that interpolating between unitary precoders can reduce complexity and/or feedback without significantly degrading performance.

While the above embodiment has been described with reference to subcarriers in a spectrum defined in the frequency domain, it would also be appropriate to consider the implementation of preceding in the context of data streams to be imposed on a channel in other ways. For instance, data streams could be defined by way of time slots in the time domain with regard to a data transmission period. Alternatively, code or space or any other manner of enabling the placement of multiple data streams on a channel can give rise to an opportunity to implement an embodiment of the invention.

Further features and advantages of aspects of the invention will be apparent from the foregoing description. However, the reader will appreciate that no statement made within the specific description should be read as a limitation on the scope of protection, which is defined by the claims appended hereto.

The invention claimed is:

1. A method of precoding a plurality of subcarriers in preparation for MIMO transmission, the subcarriers bearing one or more data streams, the number of data streams equating to the number of transmit antennas employed in said MIMO transmission, the method comprising deriving, from respective acquired unitary precoder matrices for two of said subcarriers, interpolated precoder matrices for subcarriers intermediate said two subcarriers, and applying said acquired and interpolated precoder matrices, as the case may be, at the respective subcarriers, the step of deriving said interpolated precoder matrices comprising the steps of determining an overall rotation matrix representing a transformation between said acquired precoder matrices, determining from said overall rotation matrix a further rotation matrix representing a step transformation for interpolation steps between said two subcarriers, and recursively applying said further rotation matrix to derive said interpolated precoder matrices.

2. A method in accordance with claim 1 wherein the step of determining said further rotation matrix comprises computing an eigenvalue decomposition of the overall rotation matrix.

3. A method in accordance with claim 1 and including the step of acquiring said acquired matrices from a return channel from a receiver in receipt of a MIMO transmission making use of said precoding method.

4. A method in accordance with claim 1 wherein the step of acquiring said acquired matrices comprises estimating said matrices from channel information observed at the transmitter.

5. A method in accordance with claim 1 wherein said interpolation steps, for matrices for subcarriers between said subcarriers associated with said acquired matrices, are uniform.

6. A method in accordance with claim 1 wherein said subcarriers are defined in frequency in a spectrum on subcarriers of said spectrum.

7. A method in accordance with claim 1 wherein said subcarriers are defined in the time domain as timeslots in a data transmission period.

8. A method of transmitting data comprising a plurality of subcarriers, comprising precoding the subcarriers in accordance with the method of claim 1, transforming the precoded subcarriers into a plurality of time domain signals and driving respective transmit antennas with said time domain signals.

9. A method of preceding a plurality of subcarriers in preparation for MIMO transmission, the subcarriers bearing one or more data streams, the number of data streams being less than the number of transmit antennas employed in said MIMO transmission, the method comprising deriving, from respective acquired rectangular precoder matrices for two of said subcarriers, interpolated precoder matrices for subcarriers intermediate said two subcarriers, and applying said acquired and interpolated precoder matrices, as the case may be, at the respective subcarriers, the step of deriving said interpolated precoder matrices comprising the steps of converting said acquired matrices into square unitary matrices, determining an overall rotation matrix representing a transformation between said converted matrices, determining from said overall rotation matrix a further rotation matrix representing a step transformation for interpolation steps between said acquired data streams, and recursively applying said further rotation matrix to derive said interpolated precoder matrices.

10. A method of precoding in accordance with claim 9 wherein said step of converting comprises augmenting each said non-square matrix by nullspace.

11. A carrier medium storing computer executable instructions operable to configure a computer to perform the method of any of claims 1 to 8.

12. A precoder for preceding a plurality of subcarriers in preparation for MIMO transmission, the subcarriers bearing one or more data streams, the number of data streams equating to the number of transmit antennas employed in said MIMO transmission, comprising interpolation means for deriving, from respective acquired unitary precoder matrices for two of said subcarriers, interpolated precoder matrices for subcarriers intermediate said two subcarriers, and precoder application means for applying said acquired and interpolated precoder matrices, as the case may be, at the respective subcarriers, wherein the interpolation means is operable to determine an overall rotation matrix representing a transformation between said acquired precoder matrices, to determine from said overall rotation matrix a further rotation matrix representing a step transformation for interpolation steps between said acquired subcarriers, and further to apply recursively said further rotation matrix to derive said interpolated precoder matrices.

13. A precoder in accordance with claim 12 wherein said interpolation means is operable to determine said further rotation matrix by computing an eigenvalue decomposition of the overall rotation matrix.

14. A precoder in accordance with claim 12 wherein said acquired matrices are acquired in use from a return channel from a receiver in receipt of a MIMO transmission precoded by said precoder.

15. A precoder in accordance with claim 12 wherein said acquired matrices are estimated from channel information observed at a transmitter employing said precoder.

16. A precoder in accordance with claim 12 wherein said interpolation means is operable to define uniform interpolation steps.

17. A MIMO transmitter for transmitting data defined on a plurality of data streams, comprising a plurality of transmit antennas, a precoder in accordance with claim 12 operable to precode the subcarriers onto the transmit antennas, transformation means for transforming the precoded subcarriers into a plurality of time domain signals and antenna driving means for driving respective transmit antennas with said time domain signals.

18. A precoder for preceding a plurality of subcarriers in preparation for MIMO transmission, the subcarriers bearing one or more data streams, the number of data streams being less than the number of transmit antennas employed in said MIMO transmission, the precoder including interpolation means operable to derive, from respective acquired non-unitary precoder matrices for two of said subcarriers, interpolated precoder matrices for data streams intermediate said two subcarriers, and precoder matrix application means operable to apply said acquired and interpolated precoder matrices, as the case may be, at the respective subcarriers, and further including data conversion means operable to convert said acquired matrices into square unitary matrices, said interpolation means being operable to determine an overall rotation matrix representing a transformation between said converted matrices, then operable to determine from said overall rotation matrix a further rotation matrix representing a step transformation for interpolation steps between said acquired subcarriers, and further operable to applying recursively said further rotation matrix to derive said interpolated precoder matrices.

19. A precoder in accordance with claim 18 wherein said data conversion means is operable to convert each said non-square matrix into a square matrix by augmenting the same with null space.

* * * * *